(12) United States Patent
Mengi et al.

(10) Patent No.: US 12,233,889 B2
(45) Date of Patent: Feb. 25, 2025

(54) SYSTEM AND METHOD FOR IMPLEMENTING AUTOMATED VEHICLE ASSISTANCE FUNCTIONS

(71) Applicant: Ford Global Technologies, LLC, Dearborn, MI (US)

(72) Inventors: Cem Mengi, Aachen (DE); Aditya Deodhar, Essex (GB); Warren Knight, Chelmsford (GB); Roman Atilla Koch, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 18/063,400

(22) Filed: Dec. 8, 2022

(65) Prior Publication Data
US 2023/0182684 A1 Jun. 15, 2023

(30) Foreign Application Priority Data
Dec. 10, 2021 (DE) .......................... 102021132613.3

(51) Int. Cl.
*B60W 50/08* (2020.01)
*B60R 16/02* (2006.01)
(Continued)

(52) U.S. Cl.
CPC .......... *B60W 50/085* (2013.01); *B60R 16/02* (2013.01); *B60R 16/037* (2013.01); *B60W 50/0098* (2013.01); *B60W 50/087* (2013.01)

(58) Field of Classification Search
CPC .......... B60W 50/085; B60W 50/0098; B60W 50/087; B60R 16/037; B60R 16/02
See application file for complete search history.

(56) References Cited

U.S. PATENT DOCUMENTS

| 11,618,398 B2 * | 4/2023 | Carlhoff | B60R 16/0373 701/48 |
| 2014/0309885 A1 * | 10/2014 | Ricci | G01C 21/3484 701/41 |

(Continued)

FOREIGN PATENT DOCUMENTS

KR 20160110856 A * 9/2016 ............. B60R 16/02

OTHER PUBLICATIONS

Translation of KR-20160110856-A, 8 pages (Year: 2016).*

*Primary Examiner* — Dale W Hilgendorf
(74) *Attorney, Agent, or Firm* — Emily Drake; Eversheds Sutherland (US) LLP

(57) ABSTRACT

A system for implementing automated vehicle assistance functions may include at least one vehicle having functional units, with which the vehicle assistance functions are executable, and at least one cloud system, which is connectable to the vehicle via a communication link. To enable automated generation and variation of the vehicle-specific automation sequences, which are formed from a sequence of vehicle assistance functions, the cloud system may be configured to receive predefined rule specifications assigned to the vehicle assistance functions, check whether the rule specifications meet predefined original equipment manufacturer regulations and/or customer requirements and/or regional legal requirements, store the rule specifications that meet the predefined original equipment manufacturer regulations and/or customer requirements and/or regional legal requirements, assign a certain rule set of stored rule specifications to data specific for the vehicle, and store this certain rule set for the vehicle in a manner that is downloadable via the communication link.

6 Claims, 4 Drawing Sheets

(51) Int. Cl.
*B60R 16/037* (2006.01)
*B60W 50/00* (2006.01)

(56) References Cited

U.S. PATENT DOCUMENTS

| | | | |
|---|---|---|---|
| 2014/0316609 A1* | 10/2014 | Washington | B60R 16/037 |
| | | | 701/2 |
| 2015/0226146 A1* | 8/2015 | Elwart | F02N 11/0818 |
| | | | 701/112 |
| 2016/0368507 A1* | 12/2016 | Geissenhöner | B60W 50/10 |
| 2021/0011709 A1* | 1/2021 | Itatsu | B60R 16/02 |
| 2021/0053515 A1* | 2/2021 | Dombrovskis | B60H 1/00742 |
| 2021/0309235 A1* | 10/2021 | Carlhoff | B60R 16/037 |
| 2022/0250583 A1* | 8/2022 | Garg | B60R 25/102 |
| 2022/0396240 A1* | 12/2022 | Inokuchi | B60R 16/0237 |
| 2023/0154246 A1* | 5/2023 | Fang | G07C 5/0841 |
| | | | 701/23 |
| 2023/0202498 A1* | 6/2023 | Aksyutina | G05D 1/021 |
| | | | 701/36 |
| 2024/0134628 A1* | 4/2024 | Teraoka | G06F 13/00 |

* cited by examiner

SYSTEM AND METHOD FOR IMPLEMENTING AUTOMATED VEHICLE ASSISTANCE FUNCTIONS

CROSS-REFERENCE TO RELATED APPLICATIONS

The applications claims priority to and the benefit of German Application No. 102021132613.3, filed Dec. 10, 2021, which is hereby incorporated by reference herein in its entirety.

FIELD OF THE INVENTION

The disclosure relates to a system for implementing automated vehicle assistance functions.

BACKGROUND OF THE INVENTION

Delivery drivers make a hundred or more delivery stops per working day, wherein the delivery drivers generally carry out recurring actions at every stop to secure the delivery vehicle. A delivery stop can be subdivided mainly into two phases, namely the arrival at the destination and the departure from the destination. Typically, repetitive actions for the arrival at the destination are, for example, stopping the engine, switching off the ignition, closing the windows, switching on the hazard warning lights, locking the delivery vehicle, etc. Typically, repetitive actions for the departure from the destination are, for example, unlocking the delivery vehicle, switching on the ignition, starting the engine, switching off the hazard warning lights, opening the windows, etc. A delivery assistance system automates the aforementioned repetitive actions, and so the number of manual actions can be reduced, the time efficiency can be improved, and the stress as well as a cognitive overload of the delivery driver can be reduced.

Conventionally, a delivery assistance system automates the aforementioned actions either in a static manner, i.e., a predefined series of actions is automated and carried out at each delivery stop as a non-changeable overall sequence of actions, or in a way that is configurable by the delivery driver, in which the delivery driver can limit the predefined series of actions that are to be automated for each delivery stop. In this way, the delivery driver can, for example, deactivate the switching on or off of the hazard warning lights within the automation sequence if an activation of the hazard warning lights is impermissible at certain delivery stops.

A disadvantage of the conventional automation of actions is that a conventional delivery assistance system of a vehicle cannot dynamically change its automation sequence itself. If, for example, it begins to rain after the arrival at the destination and before the departure from the destination, it may nevertheless happen that the windows are opened by the delivery assistance system upon the departure from the destination if this is intended by the automation sequence. Another example of the disadvantageous utilization of a static automation sequence is the conventional delivery assistance system locking the doors of the vehicle when the delivery driver has exited the delivery vehicle, even though a passenger is still in the delivery vehicle. In addition, it can be impermissible at many locations to switch on hazard warning lights, which a static automation sequence cannot take into account, however.

DE 10 2020 109 360 A1 relates to a system for automating vehicle functions of a vehicle. The system has a receiving unit including means for receiving vehicle function flow charts, which predefine a sequence of vehicle functions in the presence of a triggering event linked to the particular vehicle function flow chart, a test unit including means for testing the received vehicle function flow charts, a memory unit including means for storing the tested vehicle function flow charts, and a control unit including means for checking the presence of a triggering event, selecting a stored vehicle function flow chart linked to the present triggering event, generating control signals for controlling vehicle functional devices according to the selected vehicle function flow chart, and outputting the generated control signals at the vehicle functional devices.

DE 10 2020 109 379 A1 relates to a method for the automated execution of vehicle functions. The method includes checking the presence of a triggering event; if a triggering event is present, selecting a vehicle function flow chart linked to the present triggering event, generating and outputting a signal representing the linked vehicle function flow chart to a service, generating and outputting service signals based on the signal representing the linked vehicle function flow chart to control units designed to control vehicle functional devices, generating and outputting control signals based on the service signals to the vehicle functional devices, and executing vehicle functions based on the control signals.

The still unpublished German patent application DE 10 2020 210 734 relates to a system for validating a command sequence for controlling a vehicle. The system includes the vehicle, a user-side computing unit, and cloud-based structures for carrying out a virtual test run of the command sequence, wherein the computing unit exchanges data with the cloud and the cloud exchanges data with the vehicle.

US 2009/093 925 A1 discloses an electric control system for a vehicle, with which selected operating variables or predetermined operator actions are monitorable to identify a delivery stop and, when the vehicle comes to a stop, various vehicle functions may be invoked to give warning to others that the vehicle is stopped for a delivery, to assist the driver in making the delivery and, possibly, securing the vehicle while the driver is outside of the vehicle.

US 2014/316 609 A1 discloses a customization control system for a vehicle that includes an occupant compartment. The system includes a source of vehicle location data, a door, which is coupled to the occupant compartment and has a window, which is movable in relation to the door between a first, closed position and a second, open position, and a customization module, which, based on the vehicle location data, outputs setting data for the vehicle that include a movement for the window in relation to the door.

BRIEF DESCRIPTION OF THE FIGURES

Further advantageous embodiments of the disclosure are disclosed in the dependent claims and the following description of the figures, in which:

In the different figures, identical parts are always provided with the same reference characters, which is why these identical parts are also generally described only once.

DETAILED DESCRIPTION

Figure 1:
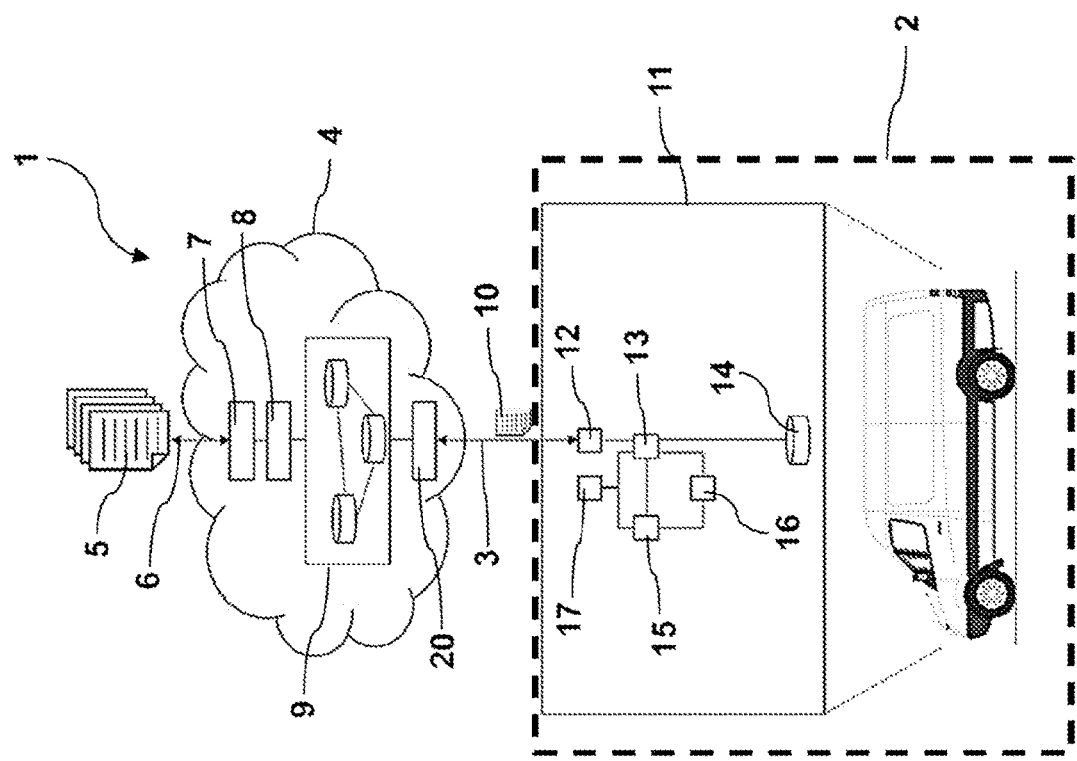
FIG. 1 shows a schematic representation of an exemplary embodiment of a system according to the disclosure.

The disclosure is directed to a system for implementing automated vehicle assistance functions, the system including at least one vehicle having functional units, with which the vehicle assistance functions are executable, and at least one cloud system, which is connectable to the vehicle via a communication link.

A problem addressed by the disclosure is that of enabling an automated generation and variation of vehicle-specific automation sequences, which are formed from a sequence of vehicle assistance functions. The vehicle may include one or more processors that execute computer code (e.g., software) stored in memory of the vehicle for implementing feature and functions described herein, including communications with other vehicles and the cloud system described herein.

According to the disclosure, the problem is solved by a system having the features described herein, including, for example, a cloud system of which is configured to receive predefined rule specifications assigned to the vehicle assistance functions, checking whether the rule specifications meet predefined original equipment manufacturer regulations and/or customer requirements and/or regional legal requirements, or not, storing those rule specifications that meet the predefined original equipment manufacturer regulations and/or customer requirements and/or regional legal requirements, assigning a certain set of stored rule specifications to data specific for the vehicle, and storing this certain set for the vehicle in a manner that is downloadable via the communication link.

It should be noted that the features and measures described individually in the following description can be combined with each other in an arbitrary, technically meaningful way and show further embodiments of the present disclosure. The description additionally characterizes and specifies the disclosure, in particular in conjunction with the figures.

According to the disclosure, a vehicle-specific, certain set of vehicle assistance functions is generated for the vehicle, in particular the delivery vehicle, and stored for the vehicle in a manner that is downloadable from the cloud system. For this purpose, rule specifications assigned to the vehicle assistance functions can be established by original equipment manufacturers (OEM) or by fleet managers and uploaded to the cloud system, for example, an OEM cloud system. The cloud system can then check whether the uploaded rule specifications meet predefined original equipment manufacturer regulations and/or customer requirements and/or regional legal requirements, or not. On the basis of this check, the cloud system can store those rule specifications that meet the predefined original equipment manufacturer regulations and/or customer requirements and/or regional legal requirements for further processing. A distributed global database can be used for this purpose, the database managing all rule specifications that originate from various sources and can target various vehicles. As a function of data specific for the vehicle, for example, a vehicle identification number, the cloud system can assign a certain set of stored rule specifications to the vehicle and store this certain set for the vehicle in a manner that is downloadable via the communication link. After the download, the particular set of stored rule specifications, which can establish an automation sequence for various vehicle assistance functions, can be locally run within a vehicle structure of the vehicle, in particular upon the arrival of the vehicle at a destination or upon the departure from the destination.

Original equipment manufacturers and fleet managers can interact with the cloud system using a suitable communication technology, which can be based on a wireless communication technology, for example, the Internet, or on a mobile radio technology, but is not intended to be limited thereto. The vehicle can also interact with the cloud system using a suitable communication technology, which can also be based on a wireless communication technology, for example, the Internet, or on a mobile radio technology, but is not intended to be limited thereto.

The particular functional unit of the vehicle can be, for example, an electric motor-operated functional unit, an electronic functional unit, and/or an electric functional unit, with which any vehicle assistance function is executable. A vehicle assistance function can be, for example, stopping/starting the engine, switching the ignition off/on, closing/opening the windows, switching the hazard warning lights on/off, locking/unlocking the delivery truck, or the like. The system preferably includes multiple, in particular a plurality of, vehicles, each of which can communicate with the cloud system.

The vehicle can include an electronic vehicle structure having at least one communication unit, via which the communication link to the cloud system is establishable, in order to exchange information between the vehicle and the cloud system and to be able to download the particular certain set of rule specifications from the cloud system. Moreover, the vehicle structure can include at least one data processing system, with which the downloaded rule specifications can be managed and the downloaded set of rule specifications can be evaluated in real time. In addition, the vehicle structure can include at least one local rule database for storing the downloaded rule specifications. These components of the vehicle structure can interact with each other using a suitable communication technology. The communication technology can be based, for example, on a controller area network (CAN), a local interconnect network (LIN), an Ethernet technology, or the like, but is not intended to be limited thereto.

The cloud system may include a computer network, which is available via the Internet or other suitable networks, and can provide a memory for memory space, one or more processors for processing power, and application software stored in the memory and executable by the one or more processors, in order to implement the disclosure.

With the system according to the disclosure, therefore, automation sequences of vehicle functions can be varied and updated in an automated and rule-based manner, in order to be able to implement various sequences of automated vehicle assistance functions.

According to one advantageous embodiment, the cloud system is configured in such a way that, after every receipt of new predefined rule specifications, the cloud system generates an update request and transmits the update request to the vehicle via the communication link, the update request prompting the vehicle to transmit its specific data via the communication link to the cloud system, wherein the cloud system is configured in such a way that, after receipt of the specific data, the cloud system assigns a new certain set of checked and stored rule specifications to these specific data and stores this new certain set for the vehicle in a manner that is downloadable via the communication link. As a result, the certain set of rule specifications assigned to the particular vehicle is always kept up-to-date, in order to always be able to operate the vehicle with optimum functionality.

According to another advantageous embodiment, the vehicle is configured to download the certain set of rule specifications via the communication link and to store the certain set of rule specifications, and to check the stored rule specifications under consideration of sensor data of the vehicle to determine whether an application condition of the particular rule specification has been satisfied, or not, and to execute the vehicle assistance function assigned to the particular satisfied rule specification. As a result, the system can dynamically adapt an automation sequence of vehicle assistance functions, for example, to the vehicle state and/or to the surroundings state, on the basis of sensor data. For this purpose, the aforementioned vehicle structure can include at least one delivery assistance unit, which can carry out the automation of vehicle functions and the adaptation of the automation sequences, for example, by communicating with the aforementioned data processing unit. The vehicle structure includes, for this purpose, at least one sensor system, which generates the sensor data and, as a result, can transmit information regarding the instantaneous vehicle state and/or regarding the instantaneous surroundings state to the data processing unit and to the delivery assistance unit. According to the present advantageous embodiment, the system can be referred to as a rule-based, dynamic delivery assistance system. A rule specification can establish, for example, that, when it is raining, the windows of the vehicle are not opened again when the delivery driver re-enters the vehicle, even though this vehicle assistance function is included in the particular automation sequence.

A rule language can be defined for this purpose. Each rule can be made up of a freely selectable left side, followed by an arrow symbol→and a right side. The syntax and semantics of the left side can be based on linear temporal logic (LTL), which describes the behavior of reactive systems due to the introduction of temporal modalities. The right side can be made up of an instruction for defining the operating state of the particular vehicle assistance function. Primarily, these are instructions for activating or deactivating the particular vehicle assistance function. These instructions are executed only when the left side of the rule yields the value "true." With this syntax definition, rules can now be defined for extraordinary applications, in order to be able to dynamically adapt the behavior of the system. In order, for example, to deactivate the vehicle assistance function for opening and closing the windows when it begins to rain, the following rule can be described: possible RAIN→window vehicle assistance function=deactivated. In order to deactivate a vehicle assistance function for locking and unlocking the doors of the vehicle when a passenger is in the vehicle, the following rule can be described: DriverOutside and Passengerinside→locking and unlocking vehicle assistance function=deactivated. This makes, in particular, an adaptation of the system in real time possible.

According to another advantageous embodiment, the vehicle is configured to output a notification signal every time a sequence of the vehicle assistance functions to be executed by the vehicle is varied as a function of the sensor data. As a result, the dynamic adaptation of the system can be made noticeable to the delivery driver, for example, via optical and/or acoustic information. The notification signal can be output, for example, by means of a human-machine interface.

The above-described problem is also solved by a method having the features described herein, including, for example, predefined rule specifications are assigned by a cloud system to the vehicle assistance functions is checked to determine whether these rule specifications meet predefined original equipment manufacturer regulations and/or customer requirements and/or regional legal requirements, or not, those rule specifications that meet the predefined original equipment manufacturer regulations and/or customer requirements and/or regional legal requirements are stored, a certain set of stored rule specifications is assigned to data specific for a vehicle, and this certain set for the vehicle is stored in a manner that is downloadable from the cloud system via the communication link.

The advantages mentioned above with reference to the system are therefore associated with the method. In particular, the system according to one of the aforementioned embodiments or a combination of at least two of these embodiments with each other can be used for carrying out the method.

According to one advantageous embodiment of the method, the cloud system is configured in such a way that, after every receipt of new predefined rule specifications, the cloud system generates an update request and transmits the update request to the vehicle via the communication link, the update request prompting the vehicle to transmit its specific data to the cloud system via the communication link, wherein, after receipt of the specific data, a new certain set of checked and stored rule specifications is assigned to these specific data by the cloud system, and this new certain set for the vehicle is stored in a manner that is downloadable via the communication link.

According to one advantageous embodiment of the method, it is provided that the certain set of rule specifications is downloaded by the vehicle via the communication link and the certain set of rule specifications is stored, and the stored rule specifications are checked under consideration of sensor data of the vehicle to determine whether an application condition of the particular rule specification has been satisfied, or not, and the vehicle assistance function assigned to the particular satisfied rule specification is carried out.

According to one advantageous embodiment of the method, a notification signal is output by the vehicle every time a sequence of the vehicle assistance functions to be executed by the vehicle is varied as a function of the sensor data.

In another aspect of the disclosure, a computer program is described, which has commands that prompt a system according to one of the aforementioned embodiments or a combination of at least two of these embodiments with each other to carry out, when executed by a processor, a method according to one of the aforementioned embodiments or a combination of at least two of these embodiments with each other.

In yet another aspect of the disclosure, a computer-readable medium is presented, on which the aforementioned computer program is stored.

With reference to FIG. 1, shown is a schematic representation of an exemplary embodiment of a system 1 according to the disclosure for implementing automated vehicle assistance functions.

The system 1 includes at least one vehicle 2 that has electrically actuatable functional units (not shown), with which the vehicle assistance functions are executable. The vehicle 2 is a transport vehicle, in particular a delivery vehicle.

In addition, the system 1 includes a cloud system 4, which is connectable to the vehicle 2 via a communication link 3. The cloud system 4 is configured to receive, for example, from original equipment manufacturers (OEM) or from fleet managers, predefined rule specifications 5 assigned to the vehicle assistance functions via a communication link 6.

Moreover, the cloud system 4 is configured to check whether the rule specifications 5 meet predefined original equipment manufacturer regulations and/or customer requirements and/or regional legal requirements, or not. The cloud system 4 includes a data processing unit 7 for this purpose.

In addition, the cloud system 4 is configured to store those rule specifications 5 that meet the predefined original equipment manufacturer regulations and/or customer requirements and/or regional legal requirements. The cloud system 4 includes a memory unit 8 and a global rule database 9 for this purpose.

In addition, the cloud system 4 is configured to assign a certain set 10 of stored rule specifications 5 to data specific for the vehicle 2 and to store this certain set 10 for the vehicle 2 in the global rule database 9 in a manner that is downloadable via the communication link 3. The cloud system 4 includes an assignment unit 20 for this purpose.

The cloud system 4 is also configured in such a way that, after each receipt of new predefined rule specifications 5, the cloud system 4 generates an update request and transmits the update request to the vehicle 2 via the communication link 3, the update request prompting the vehicle 2 to transmit its specific data to the cloud system 4 via the communication link 3. The cloud system 4 is configured in such a way that, after receipt of the specific data, the cloud system 4 assigns a new certain set 10 of checked and stored rule specifications 5 to these specific data and stores this new certain set 10 for the vehicle 2 in a manner that is downloadable via the communication link 3.

The vehicle 2 is configured to download the certain set 10 of rule specifications 5 via the communication link 3 and to store the certain set 10 of rule specifications 5, and to check the stored rule specifications 5 under consideration of sensor data of the vehicle 2 to determine whether an application condition of the particular rule specification 5 has been satisfied, or not, and to execute the vehicle assistance function assigned to the particular satisfied rule specification 5. The vehicle 2 has a vehicle structure 11 for this purpose.

The vehicle structure 11 includes a communication unit 12, via which the communication link 3 to the cloud system 4 is establishable. Moreover, the vehicle structure 11 includes a data processing unit 13, which is configured to manage the rule specifications 5 and to evaluate the particular rule set 10 in real time. As a result, the data processing unit 13 can adapt the behavior of the vehicle 2 and the vehicle assistance functions of the vehicle 2. In addition, the vehicle structure 11 includes a local rule database 14, which is a managed store for downloaded rule specifications 5. In addition, the vehicle structure 11 includes a delivery assistance unit 15, which carries out the actual automation of vehicle assistance functions. The delivery assistance unit 15 can dynamically adapt the particular automation sequence by communicating with the data processing unit 13. The vehicle structure 11 also includes a sensor system 16, which transmits information regarding the vehicle state and/or the surroundings state to the data processing unit 13 and the delivery assistance unit 15. Moreover, the vehicle structure 11 has a human-machine interface 17, with which dynamic changes of the automation sequence can be communicated to the delivery driver, in order to make the adaptation of the automation sequence noticeable to the delivery driver. As a result, the vehicle 2 is configured to output a notification signal every time a sequence of the vehicle assistance functions to be executed by the vehicle 2 is varied as a function of the sensor data. The notification signal can be output acoustically and/or visually. For example, the notification signal can be output as a text message on a screen, preceded by an acoustic signal. The components 12 through 17 of the vehicle structure 11 can communicate via a suitable communication technology, for example, via a controller area network (CAN), a local interconnect network (LIN), or via the Ethernet.

Figure 2:
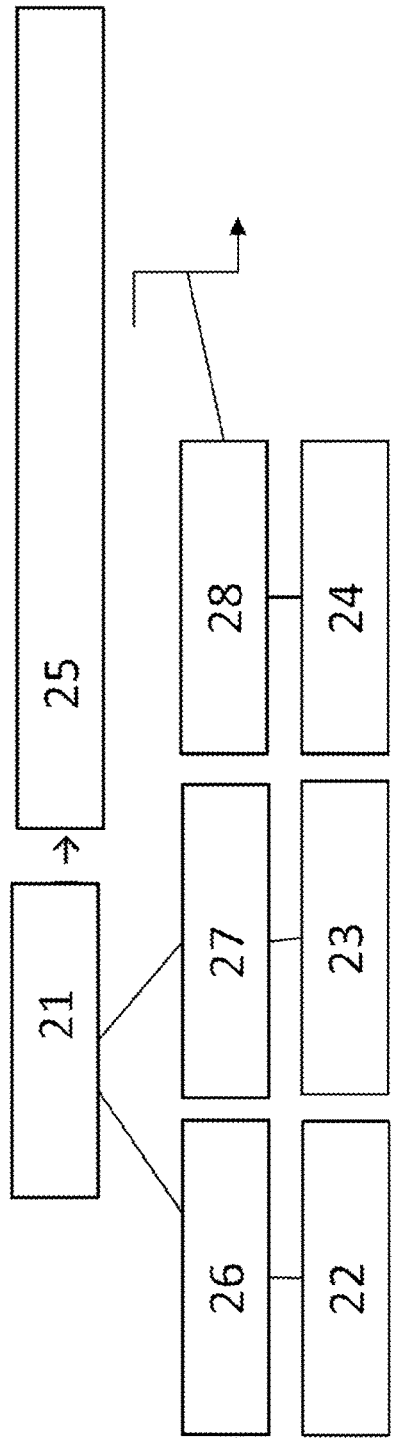
FIG. 2 shows an exemplary embodiment of an assignment of a rule premise to specific vehicle data.

FIG. 2 shows an exemplary embodiment of an assignment of a rule premise or condition "possible RAIN" 21 to specific vehicle data 22, 23, and 24 (XYZ, ABC, and GHI). In the upper area, a rule is described, which establishes that the vehicle assistance function 25, for example, "Open windows when the driver enters the vehicle," is deactivated when it rains. The vehicle having the specific vehicle data 22, for example, the vehicle identification number XYZ, can assign its signal 26 (b_is_raining) to the condition "possible RAIN" and, in this way, apply the rule. The vehicle having the specific vehicle data 23, for example, the vehicle identification number ABC, can also assign its signal 27 (rain_state) to the condition "possible RAIN" and, in this way, apply the rule. The vehicle having the specific vehicle data 24, for example, the vehicle identification number GHI, does not have a signal 28 (not applicable) that could be assigned to the condition "possible RAIN," and so the rule cannot be taken into account by this vehicle.

Figure 3:
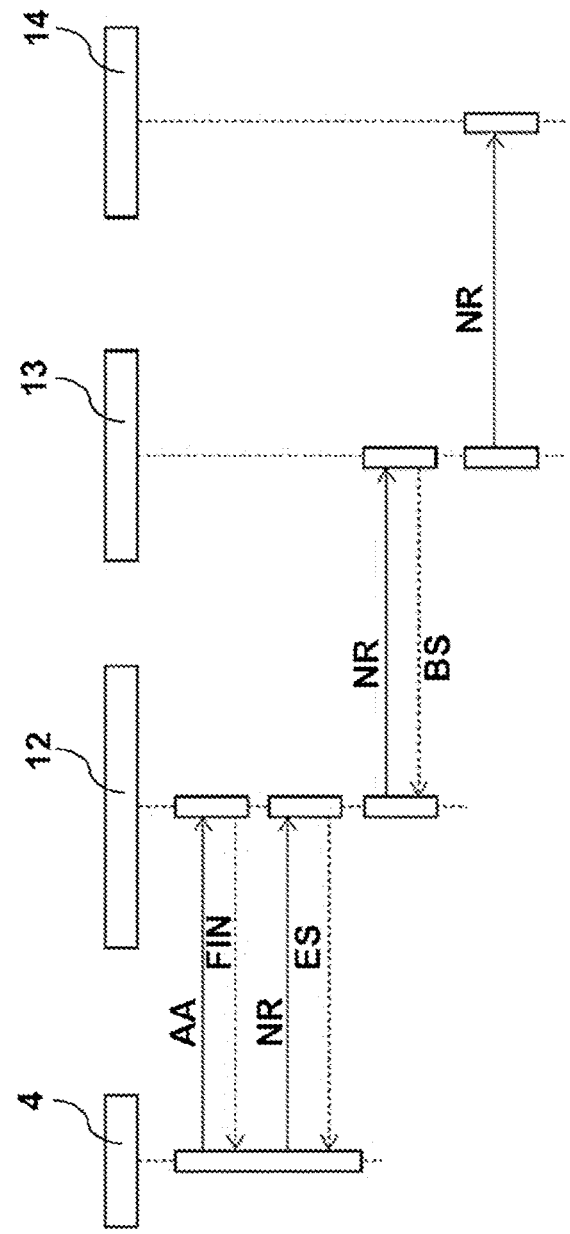
FIG. 3 shows an exemplary embodiment of an interaction protocol for updating rule specifications within a vehicle structure.

FIG. 3 shows an exemplary embodiment of an interaction protocol for updating rule specifications within a vehicle structure (not shown) that can be designed according to FIG. 1.

Initially, the cloud system 4 transmits an update request AA to the communication unit 12 of the vehicle structure after new rule specifications have been uploaded to the cloud system 4. Subsequently, the communication unit 12 transmits the vehicle identification number FIN to the cloud system 4. As a result, the cloud system 4 is now capable of deriving, from its global rule database, the correct assignment for each rule specification. The assigned rule specifications are then transmitted as a new rule set NR to the communication unit 12, which indicates the successful download to the cloud system 4 via a success signal ES.

Thereafter, the communication unit 12 makes the downloaded new rule set NR available to the data processing unit 13, which the data processing unit 13 acknowledges to the communication unit 12 with an acknowledge signal BS. The data processing unit 13 then initiates the storage of the new rule set NR in the local rule database 14.

Figure 4:
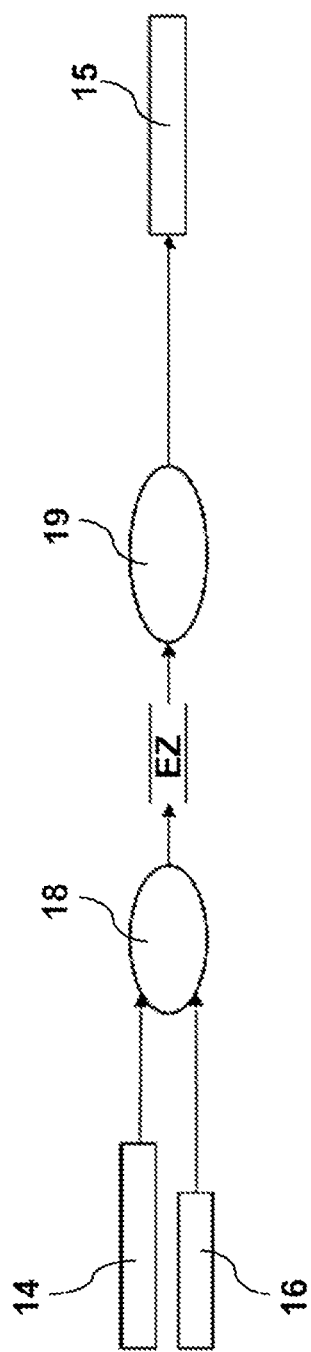
FIG. 4 shows an exemplary embodiment of a rule evaluation and an execution of implications from the perspective of a functional data stream.

FIG. 4 shows an exemplary embodiment of a rule evaluation 18 and an execution 19 of implications from the perspective of a functional data stream with the aid of the data processing unit (not shown), which carries out a check for each rule from the local database 14 to determine whether the rule specification has been satisfied, or not, wherein the particular rule satisfies the above-described rule language. For this purpose, the sensor system 16 continuously delivers sensor data of assigned signals, which are required for evaluating the left side of the particular rule. The result of this evaluation is a satisfiability state EZ for each rule. The particular satisfiability state EZ is an input, on the basis of which the execution 19 of the right side of the particular rule is checked. The delivery assistance unit 15 is activated as a function of the result of this check.

Figure 5:
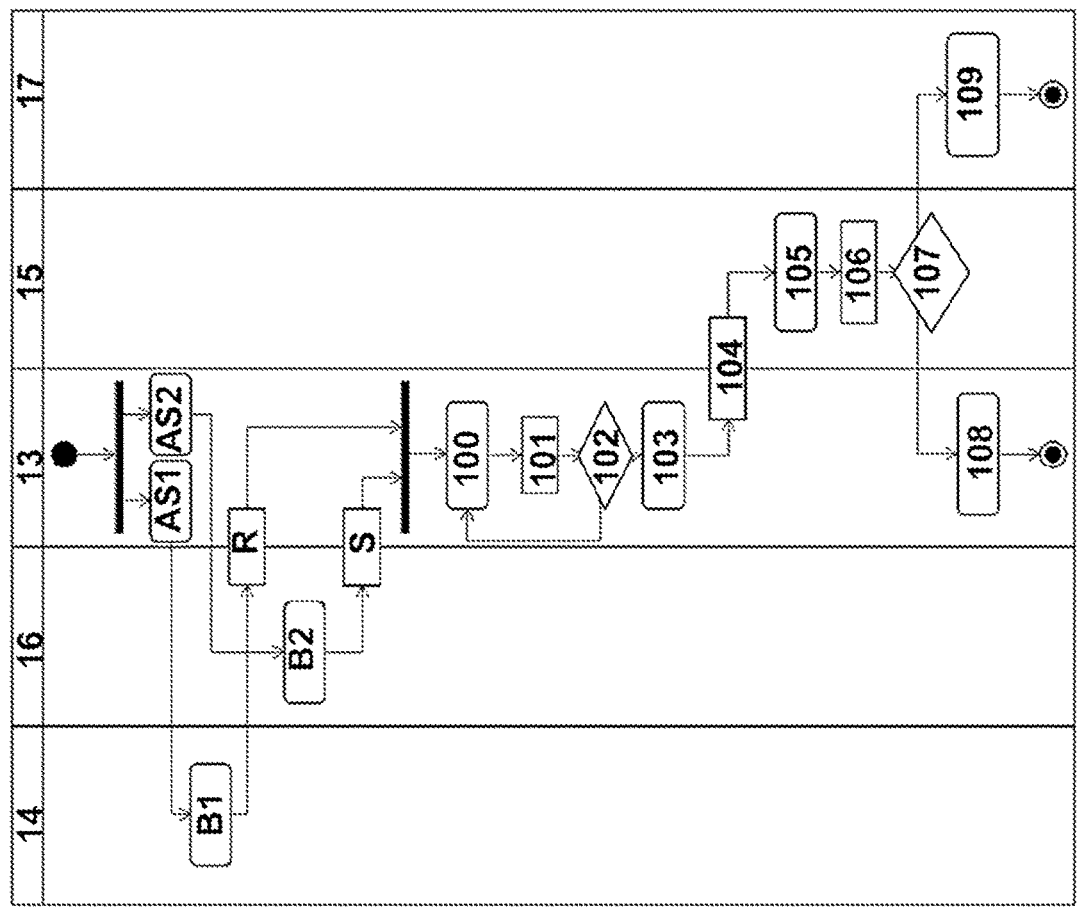
FIG. 5 shows an exemplary embodiment of a setting of vehicle assistance functions from the perspective of an activity control flow.

FIG. 5 shows an exemplary embodiment of a setting of vehicle assistance functions from the perspective of an activity control flow.

Initially, the data processing unit 13 requests the rules R from the local rule database 14 using a request signal AS1 and requests the sensor data S from the sensor system 16 using a request signal AS2, as the result of which the local rule database 14 runs the command B1 for providing rules R and the sensor system 16 runs the command B2 for providing the sensor data S. When both have been made available, the data processing unit 13 evaluates the rules R in the method step 100 and establishes the satisfiability status of the particular rule R in the method step 101. If a rule R cannot be satisfied, which the data processing unit 13 checks in the method step 102, the data processing unit 13 returns to the method step 100 and, in this way, continuously evaluates new data. If a rule R has been satisfied, the appropriate operating modes of the vehicle assistance functions are established by the data processing unit 13 in the method step 103, wherein an appropriate operating mode request 104 is generated and transmitted to the delivery assistance unit 15 by the data processing unit, and so the delivery assistance unit 15 can adapt its behavior accordingly. The delivery assistance unit 15 establishes the operating modes and acknowledges the request in the method step 105. In the method step 106, the delivery assistance unit 15 generates a piece of information regarding the adapted or instantaneous operating modes, which the delivery assistance unit 15 transmits to the data processing unit 13 in the method step 107, the data processing unit 13 updating the operating modes of the delivery assistance unit 15 in the method step 108. Simultaneously, the piece of information is to the human-machine interface 17, which generates a notification signal in the method step 109, with which the delivery driver is informed that a dynamic change has been carried out.

LIST OF REFERENCE SYMBOLS 1 system
2 vehicle
3 communication link
4 cloud system
5 rule specification
6 communication link
7 data processing unit of 4
8 memory unit of 4
9 global rule database
10 rule set
11 vehicle structure
12 communication unit
13 data processing unit of 11
14 local rule database
15 delivery assistance unit
16 sensor system
17 human-machine interface
18 rule evaluation
19 implication execution
20 assignment unit
21 rule premise/condition
22 specific vehicle data
23 specific vehicle data
24 specific vehicle data
25 vehicle assistance function, for example, "Open windows when the driver enters the vehicle"
26 signal (b_is_raining)
27 signal (rain_state)
28 signal (not applicable)
AA update request
ABC vehicle identification number
AS1 request signal
AS2 request signal
BS acknowledge signal
B1 command
B2 command
ES success signal
EZ satisfiability state
FIN vehicle identification number
GHI vehicle identification number
NR new rule set
R rules
S sensor data
XYZ vehicle identification number
100-109 method steps

What is claimed is:

1. A system for implementing automated vehicle assistance functions, the system comprising:
at least one cloud system, which is connectable to a first vehicle and a second vehicle via a communication link, wherein the cloud system is configured to:
receive predefined rule specifications assigned to the vehicle assistance functions,
check whether the rule specifications meet predefined first original equipment manufacturer regulations for the first vehicle, first customer requirements for the first vehicle, and first regional legal requirements for the first vehicle,
store the rule specifications that meet the predefined first original equipment manufacturer regulations for the first vehicle, the first customer requirements for the first vehicle, and the first regional legal requirements for the first vehicle,
assign a first rule set of stored rule specifications to a first vehicle identification number specific for the first vehicle,
store the first rule set for the first vehicle in a manner that is downloadable by the first vehicle via the communication link,
check whether the rule specifications meet predefined second original equipment manufacturer regulations for the second vehicle, second customer requirements for the second vehicle, and second regional legal requirements for the second vehicle,
store the rule specifications that meet the predefined second original equipment manufacturer regulations for the second vehicle, the second customer requirements for the second vehicle, and the second regional legal requirements for the second vehicle,
assign a second rule set of stored rule specifications to a second vehicle identification number specific for the second vehicle, wherein the second rule set is different from the first rule set, and
store the second rule set for the second vehicle in a manner that is downloadable by the second vehicle via the communication link,
wherein the first vehicle is configured to:
download the first rule set of rule specifications via the communication link,
store the first rule set of rule specifications,
check the stored rule specifications under consideration of sensor data of the first vehicle to determine whether an application condition of a particular rule specification of the stored rule specifications has been satisfied, and execute the vehicle assistance function assigned to the particular satisfied rule specification.

2. The system according to claim 1, wherein the cloud system is further configured to:
receive new predefined rule specifications assigned to the vehicle assistance functions,
generate a first update request for the first vehicle,
transmit the first update request to the first vehicle via the communication link, the first update request prompting the first vehicle to transmit the first vehicle identification number via the communication link to the cloud system,
after receipt of the first vehicle identification number, assign a new first rule set of checked and stored rule specifications to the first vehicle identification number,
store the new first rule set for the first vehicle in a manner that is downloadable by the first vehicle via the communication link,
generate a second update request for the second vehicle,
transmit the second update request to the second vehicle via the communication link, the second update request prompting the second vehicle to transmit the second vehicle identification number via the communication link to the cloud system,
after receipt of the second vehicle identification number, assign a new second rule set of checked and stored rule specifications to the second vehicle identification number, wherein the new second rule set is different from the new first rule set, and
store the new second rule set for the second vehicle in a manner that is downloadable by the second vehicle via the communication link.

3. The system according to claim 1, wherein the first vehicle is configured to output a notification signal every time a sequence of the vehicle assistance functions to be executed by the first vehicle is varied as a function of the sensor data.

4. A method for a system for implementing automated vehicle assistance functions, the method comprising:
checking, by a cloud system, predefined rule specifications assigned to vehicle assistance functions to determine whether the rule specifications meet predefined first original equipment manufacturer regulations for a first vehicle, first customer requirements for the first vehicle, and first regional legal requirements for the first vehicle,
storing the rule specifications that meet the predefined first original equipment manufacturer regulations for the first vehicle, the first customer requirements for the first vehicle, and the first regional legal requirements for the first vehicle,
assigning a first rule set of stored rule specifications to a first vehicle identification number specific for the first vehicle,
storing the first rule set for the first vehicle in a manner that is downloadable from the cloud system by the first vehicle via a communication link,
checking, by the cloud system, the predefined rule specifications assigned to the vehicle assistance functions to determine whether the rule specifications meet predefined second original equipment manufacturer regulations for a second vehicle, second customer requirements for the second vehicle, and second regional legal requirements for the second vehicle,
storing the rule specifications that meet the predefined second original equipment manufacturer regulations for the second vehicle, the second customer requirements for the second vehicle, and the second regional legal requirements for the second vehicle,
assigning a second rule set of stored rule specifications to a second vehicle identification number specific for the second vehicle,
storing the second rule set for the second vehicle in a manner that is downloadable from the cloud system by the second vehicle via a communication link,
downloading, by the first vehicle, the first rule set of rule specifications via the communication link;
storing the first rule set of rule specifications,
checking the stored rule specifications under consideration of sensor data of the first vehicle to determine whether an application condition of a particular rule specification of the stored rule specifications has been satisfied, and
executing the vehicle assistance function assigned to the particular satisfied rule specification.

5. The method according to claim 4, further comprising:
receiving, by the cloud system, new predefined rule specifications assigned to the vehicle assistance functions;
generating, by the cloud system, a first update request for the first vehicle;
transmitting the first update request to the first vehicle via the communication link, the first update request prompting the first vehicle to transmit the first vehicle identification number via the communication link to the cloud system;
after receipt of the first vehicle identification number, assigning a new first rule set of checked and stored rule specifications to the first vehicle identification number;
storing the new first rule set for the first vehicle in a manner that is downloadable by the first vehicle via the communication link;
generating, by the cloud system, a second update request for the second vehicle;
transmitting the second update request to the second vehicle via the communication link, the second update request prompting the second vehicle to transmit the second vehicle identification number via the communication link to the cloud system;
after receipt of the second vehicle identification number, assigning a new second rule set of checked and stored rule specifications to the second vehicle identification number; and
storing the new second rule set for the second vehicle in a manner that is downloadable by the second vehicle via the communication link.

6. The method according to claim 4, further comprising receiving from the vehicle a notification signal every time a sequence of the vehicle assistance functions to be executed by the first vehicle is varied as a function of the sensor data.

* * * * *